May 14, 1935. H. O. KITTLESON 2,001,253
LOAD HANDLING APPARATUS
Filed Sept. 21, 1933
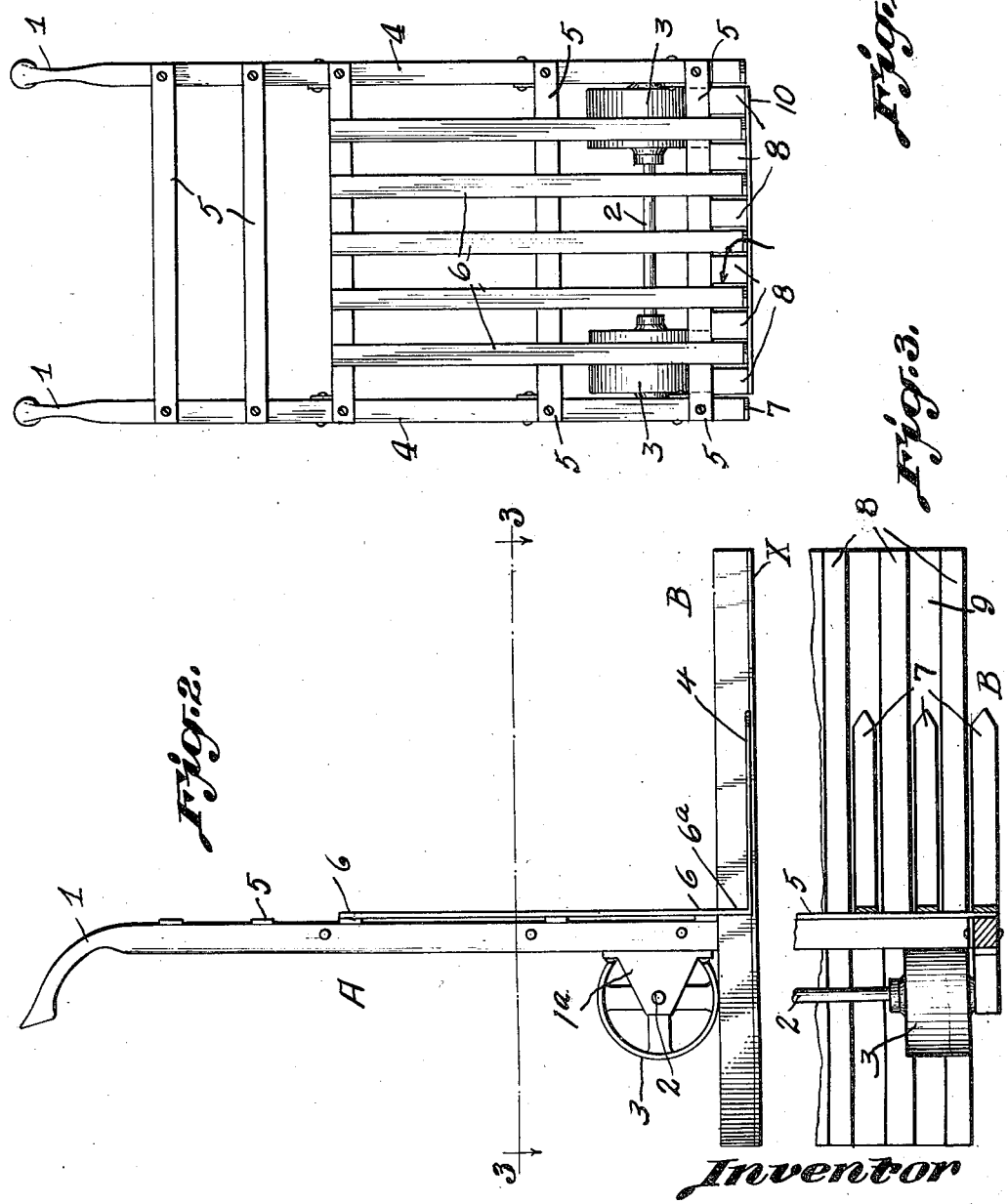
Inventor
Henry O. Kittleson Patented May 14, 1935

2,001,253

UNITED STATES PATENT OFFICE 2,001,253

LOAD HANDLING APPARATUS

Henry O. Kittleson, Milan, Minn.

Application September 21, 1933, Serial No. 690,432

7 Claims. (Cl. 214—65)

This invention relates to an improvement in loading apparatus, and more particularly to a novel combination including a hand truck having special features and characteristics adapting the same for use in connection with a special floor or platform on which stacked bags, boxes or similar articles are supported.

A primary object of the invention is to provide a load handling apparatus which greatly facilitates the handling or manipulation of an increment of the load supported by a floor or its equivalent. That is to say, the invention is directed to the combination of a load sustaining floor built in a permanent or fixed location and having grooves or channels which permit of spaced tines or teeth, mounted on one end of a truck, readily engaging beneath a series of stacked articles so that the operator of the truck may easily place one end thereof beneath the stacked articles and lift them from their position on the floor with a minimum of effort and maximum convenience, thereby greatly facilitating the load handling operation.

A further object of the invention is to provide a permanent load sustaining support or floor having the surface of its load supporting elements so arranged and spaced that the load increment may not only be easily lifted, but also to provide a truck having wheels whose treads are wider than the channels or grooves in the permanent floor so that the truck may readily move thereover.

With the above and other objects in view which will become more readily apparent as the nature of the invention is better understood, the invention consists in the novel features of construction, combination and arrangement of parts, hereinafter more fully described, illustrated in the accompanying drawing and defined in the appended claims.

A preferred and practical embodiment of the invention is shown in the accompanying drawing, in which:—

Figure 1 is a vertical elevation illustrating the combined floor and truck.

Figure 2 is a side elevation of the construction shown in Figure 1.

Figure 3 is a horizontal cross-sectional view taken on the line 3—3 of Figure 2.

Similar reference characters designate corresponding parts throughout the several figures of the drawing.

In the embodiment shown, the invention preferably includes in its organization a mobile hand truck A and a relatively fixed or permanent floor or load sustaining element B.

The truck proper preferably consists of a body including the handles 1—1 at one end thereof and suitable brackets 1ª at the opposite end thereof for mounting a transverse axle 2 having thereon the wheels 3. As will be apparent from the drawing, the treads of these wheels are relatively wide for the purpose hereinafter indicated.

The side rails 4—4 of the truck are connected by the transverse members 5—5 and the latter in turn have secured thereto the spaced longitudinally disposed members 6—6 which project beyond one end of the truck as indicated at 6ª and are bent at right angles as indicated at 7 to provide a plurality of spaced tines or teeth which serve as load pick-up members. The aforesaid plurality of tines cooperate to provide a load lifting and sustaining toe portion for the truck, and the spacing of these tines is governed by the channels or depressions in the special floor construction B. That is to say, the floor B which is a permanent or relatively fixed load sustaining support consists of a plurality of spaced strips or ribs 8 having the grooves or channels 9 therebetween for receiving the tines 7. The strips 8 are suitably anchored in spaced-apart relation to a base which may be a platform, floor or other surface, or they may be united by a transverse connecting member 10 which will keep them in permanently assembled relation.

The essential features or characteristics of the load sustaining floor B is that it consists of a plurality of load sustaining members which are spaced to receive therebetween the tines of the mobile truck, the treads of the wheels 3 of the truck being wider than the spacing between the strips 8 or their equivalent so that the truck may roll or ride freely on the upper surfaces of the strips whose upper faces constitute the load sustaining surface of the floor.

In any event the permanent or fixed floor includes raised and depressed portions, the former providing traction and load supporting surface and the latter receiving the pick-up means of the mobile truck.

In practice, bags, boxes or the like are supported on the load sustaining floor formed by the spaced strips 8 and the mobile truck A is manipulated over the upper surface of the floor in such a way that when it is desired to lift and move stacked or piled articles such as bags or boxes, the tines 7 are brought into registering relation with the grooves or channels 9 and the truck tilted forwardly so that the tines, therefore, pass into the channels and may be moved beneath the articles carried by the upper surfaces of the strips 8. By manipulating the hand truck on the axle 2 as a fulcrum as well as an axis of rotation, the particular increment of the load to be handled may be readily shifted on the truck and transported with great facility to a further point of handling.

The invention is particularly useful in connection with bags of cement, boxes, barrels and the like and it is believed that many advantages will be readily appreciated by those skilled in the art.

It will of course be understood that changes in the form, dimensions and size of both the truck and the floor may be resorted to without departing from the spirit of the invention and scope of the appended claims.

I claim:—

1. A load handling apparatus comprising in combination, a floor having load sustaining and traction surfaces formed in a common plane and including a plurality of parallel grooves forming continuous channels extending to a depth below the plane of the load sustaining and traction surfaces, and a truck having wheels whose treads are wider than the grooves forming the channels and adapted for tractive engagement in any direction with the load sustaining and traction surfaces of the floor and having load pick-up members of a width adapted to be moved into any selected channels by tilting the truck on the axle wheels to pick up a load from any location on the load sustaining and traction surfaces.

2. A load handling apparatus comprising in combination, a floor having load sustaining and traction surfaces formed in a common plane and including a plurality of grooves forming continuous channels extending to a depth below the plane of the load sustaining and traction surfaces, said surfaces being adapted to receive load increments at any location throughout the area thereof, and a wheeled truck adapted for tractive engagement with said load sustaining and traction surfaces and movable promiscuously thereover in any direction to reach the point of a selected load to be removed, said truck having load pick-up members adapted to be inserted into selected channels beneath the load by tilting the truck forwardly to pick up the load and to be released from the channels by tilting the truck backwardly to permit the truck to travel across the combined load sustaining and traction surfaces at any angle.

3. A load handling apparatus comprising in combination, a combined load sustaining and traction support including a plurality of spaced members having channels therebetween, and a mobile truck having wheels whose treads are movable over the tops of said spaced members in any direction and having a plurality of spaced tine elements adapted to enter said channels and engage beneath a load resting on said members while the truck is supported on the tops thereof.

4. A load handling apparatus comprising in combination, a permanent load sustaining floor having a combined load sustaining and traction surface formed by a plurality of strips spaced to provide grooves, and a truck having wheels adapted to roll in any direction on the top surfaces of said strips, said truck also having load pick-up members spaced according to the spacing of said strips, whereby the said load pick-up members may be inserted between the strips while the truck wheels ride on the top surfaces thereof.

5. A load handling apparatus comprising, in combination, a combined load sustaining and traction floor having its surface formed by a plurality of strips spaced to provide channels therebetween, and a mobile truck provided with wheels having tread portions of greater width than the space between the strips, thereby to roll in any direction on the upper surface thereof, said truck also having a plurality of spaced load pick-up members of a width to enter the channels between the strips and to be released therefrom by tilting the truck while said wheels rest on the tops of the strips.

6. A load handling apparatus comprising in combination, a permanent combined load sustaining and traction floor having alternate raised and depressed portions, and a mobile truck including wheels adapted to travel solely on the upper surface of said raised portions of said floor in any direction and having a load pick-up portion adapted to enter any selected one of said depressed portions to pick up load increments for removal from the raised portions of said floor, while the wheels of the truck are resting thereon.

7. A load handling apparatus comprising in combination, a combined load sustaining and traction floor including alternate raised and depressed portions, and a truck having load pick-up members at one end adapted to enter said depressed portions, said truck provided with wheels whose treads are wider than the depressed portions thereby to travel in any direction on the raised portions only of the floor and whereby said load pick-up members may be inserted and released from selected depressed portions beneath the load to be removed.

HENRY O. KITTLESON.